Patented Apr. 15, 1941

2,238,329

UNITED STATES PATENT OFFICE 2,238,329

PROCESS FOR PRODUCTION OF A DERIVED VEGETABLE PROTEIN

Percy L. Julian, Oak Park, and Andrew G. Engstrom, Chicago, Ill., assignors to The Glidden Company, Cleveland, Ohio, a corporation of Ohio No Drawing. Application December 3, 1937, Serial No. 177,926

13 Claims. (Cl. 260—112)

This invention relates to the production of vegetable protein from materials containing natural vegetable protein, such as oil-bearing nuts and seeds. More particularly, the invention relates to the method of producing a derived vegetable protein having high dispersability in protein solvents and solutions of which show low viscosity and which do not set to stiff gels.

The native proteins in oleaginous seeds and nuts consists of a variety of proteins which are widely classified into three general groups: water soluble albumins, coagulable by heat; salt-soluble or acid and alkali soluble globulins and glutelins; and prolamines or alcohol soluble proteins. (See Gortner's "Outlines of Biochemistry," John Wiley and Sons, 1929, page 360.)

Whenever the term "seeds" or "nuts" is used herein, it is used to include proteinaceous vegetable seeds or nuts containing oil, such as whole soybeans, castor beans, peanuts, linseed, lupine, et cetera. Whenever the term "meal" is used herein, it is used to include the meal which results from the removal of the oil, whether by hydraulic pressure, extraction by solvent, or by the expeller process, and whether the oil is removed in whole or in part. Whenever the term "flakes" is used herein, it is understood to represent a product resulting from the passage of the whole or cracked seed or nuts through smooth rolls to produce flakes. These flakes may or may not contain oil. The term "proteinaceous seed or nut material" is intended to include any of the above defined materials. While it is understood that the invention may be practiced employing all proteinaceous seeds and nuts or flakes and meal therefrom, or any other material containing native vegetable protein, the invention will be illustrated by description of the process employing extracted soybean flakes containing not more than one per cent fat.

The art of extracting protein from soya beans by alkali, such as borax, soda ash, trisodium phosphate, sodium hydroxide, ammonium hydroxide, et cetera, is well known. When so prepared the soybean protein is often found to disperse poorly in the usual cutting agents such as alkaline materials, giving solutions of high viscosity and a high dispersion residue; or if dispersed readily, results in solutions which are highly viscous and set to stiff gels even at relatively low concentration of protein. Also, protein prepared by methods previously described in the literature, has relatively poor adhesive qualities as compared to milk casein, for example.

These properties of high viscosity, gel formation and dispersion residue render the protein unsatisfactory, particularly when used in paper coating compositions, paints, for the preparation of films, et cetera. Protein solutions which have high viscosity and gel readily cannot be smoothed out easily and satisfactorily in coatings and films. Likewise, protein which leaves a high dispersion residue on dissolution gives rough, hazy and unsatisfactory films and coatings. Moreover, protein having the unfavorable properties cited above, is the source of two additional nuisances in paper coating mills, et cetera, namely, (1) larger power cost in stirring and transferring such solutions owing to their high viscosity, and (2) when such solutions stand for a period of time, they set to stiff gels and must either be discarded or can be used only after considerable expense in bringing them back to a working consistency.

Another disadvantage to the user of a vegetable protein prepared by methods previously described in the literature is that when dispersed in the cold, such protein presents practical difficulties in that considerable time must elapse before complete dispersion, and even then, the resulting dispersion is a stiff, pasty mass difficult to handle and mix with other materials. It is, therefore, necessary to heat this dispersion to reduce its viscosity to a working consistency. This same procedure must be employed with milk casein which, likewise, possesses slow dispersion rate and gives high viscosity solutions at ordinary temperatures.

It has also been found that if the protein extracted by the previously described processes is subjected to moist heat at high temperatures, gel formation of cold alkaline solutions of such protein is very pronounced. This condition is frequently brought about in the drying of the freshly prepared protein at elevated temperatures.

In general, it may be said that one important difference between vegetable proteins and casein is that the vegetable protein tends to gel in alkaline solutions, whereas with casein the tendency to gel is much less, the casein retaining its plastic property of flowing, even though the viscosity may be quite high. This difference between vegetable proteins heretofore prepared and casein is more pronounced when used in making water paints and pigment slips, the gelling tendency of the vegetable protein being very pronounced, whereas casein retains its plasticity and flow, when admixed with the pigment.

According to the present invention, a vegetable protein is produced which has greatly improved properties over those heretofore known. Solutions of this protein have relatively low viscosities, low dispersion residues, good color, and when employed in the usual manner show improved adhesive strength. Solutions of rather high concentrations do not gel on standing. According to the process employed, the native protein of the proteinaceous seed material is changed so as to possess properties not possessed by the native protein. The protein produced as a result of the treatment is satisfactory for use in paper coating compositions, paints, and films, and in many respects is equal to casein in properties and utility.

In proceeding in accordance with the invention, any oil-bearing seed or nut may be used as starting material. It is preferable to remove the hulls and foreign matter. As applied to the production of protein from soya beans, the dehulled and cleaned beans are crushed and passed through flaking rolls. These flakes are then treated with a volatile solvent to extract the oil, and the solvent remaining in the flakes is removed, all as is well known in the art. The extracted flakes contain less than 1% of oil, and are suitable for the preparation of protein according to the invention.

For the preparation of a vegetable protein of highest adhesion, ready solubility, decreased gel tendency, low dispersion residue and reasonably good color, it has been found that treatment of the soya bean flakes with acid at elevated temperatures is desirable.

The time, temperature and acid concentration all affect the character of the protein. The temperature must be sufficiently high to coagulate the heat-sensitive protein present in the flakes. This heat-sensitive protein, if present in the final product, instead of dissolving readily swells and gives rise to a viscous mass or stiff gel. Also, this heat sensitive protein, if not previously coagulated, is affected by high temperatures in the drying step and gives rise to high gelling tendency and high dispersion residue on dissolving in alkalies. The temperature is, therefore, kept sufficiently high to deliberately coagulate this heat-sensitive protein so that it is not extracted, in the subsequent treatment by water, dilute acids and dilute alkalies.

It is believed that this hot acid treatment additionally results in a limited hydrolysis of the protein. While the exact extent of the hydrolysis is not known, it is believed that some of the amide groupings in the protein are hydrolized to carboxyl groupings and that other linkages are cleaved rendering free carboxyl groupings. This is evidenced by the fact that the protein shows increased solubility in alkalies and that more ester groupings appear in attempted esterification by the usual methods. When the proper degree of hot acid treatment is given, the resulting protein is found to be vary satisfactory. A striking example of the increased solubility of this protein is the ease with which it may be dispersed in relatively dilute solutions of sodium bicarbonate to give dispersions of comparatively low viscosity, and which dispersion unlike those made with protein prepared by previously described methods retain the flowing properties indicative of fully dispersed proteins. On the other hand, proteins prepared by other methods do not result in uniform dispersions when these same conditions are employed.

It has been found that if in the acid treatment of the flakes the pH is kept at approximately the isoelectric point of the protein (4.6–4.8) that higher yields and an improved product are obtained. It has also been found that the time and temperature of the treatment affect the results. If the acid concentration is too high, the time too long, or the temperature too high, the treatment is too severe and results in a fundamental change in the protein. Such a protein is more highly amphoteric and dissolves so readily in either acids or bases that it is difficult to precipitate it from solutions of one or the other. It is probable that a large amount of cleavage down to proteoses and peptones has taken place. However, by controlling the conditions, a product having high adhesive properties and a fairly sharp isoelectric point, can be obtained. It has been found that by conducting the treatment at a temperature between 170°–180° F. for 2 hours at a pH of 4.7, an excellent protein is obtained. The pH may, however, be lower or somewhat higher and still produce a good protein. The pH may vary between 4 and 5.2, and still produce the results, although somewhat better yields are obtained at the isoelectric point. The pH, time and temperature may be varied, provided these conditions are controlled so as to prevent excessive hydrolysis of the protein and provided the temperature is sufficient to render the heat sensitive protein insoluble in alkali.

Any water soluble acid, whether an organic or inorganic acid, may be used. It is preferred, however, to use an inorganic acid, such as sulfuric or hydrochloric, which has a high dissociation constant. The actual amount of any acid used to give the desired pH may vary on different batches, owing to the buffer action which ensues on treatment of such material with acids, and to consumption of acid by mineral salts. For the same reasons the pH of the acid mix does not immediately become constant, the pH being low upon first adding the acid. It is, therefore, desirable to add the acid in increments so as to keep the pH as near constant as possible at all times. However, we do not limit ourselves to this portionwise addition of acid, as certain advantages also accrue from use of a preliminary lower pH than that of the isoelectric point with subsequent gradual increase of pH up to that of the isoelectric point.

The acid treated flakes after removal of the major portion of the acid liquor are then subjected to an alkaline extraction to dissolve out the desired protein. The insolubilized heat-sensitive protein, fiber, and other insoluble material remain undissolved. The alkaline liquor and the insoluble material are then separated by any suitable method.

Acid is then added to the alkaline liquor to precipitate the protein as a curd. This curd is separated from the liquid, washed and dried.

The following procedure carried out on a pilot plant scale is exemplary of the process of the invention.

2500 pounds of extracted soy bean flakes containing less than 1% oil was slurried with 4500 gallons of water at 180–185° F., in a tank giving a water-flake ratio of 15 to 1 by weight. A 10% solution of sulfuric acid was then added in increments to keep the pH at approximately 4.7, and until the pH became stable at 4.7. During the addition of acid, the temperature dropped to about 170–180° F., which temperature was maintained during the acid treatment. The acidified slurry was agitated and kept at this temperature and at a pH of 4.7 for two hours. The mixture was then allowed to settle and the acid liquor drawn off, the total liquor removed being 50–60 percent of the original. Hot water acidulated so as to keep the pH of the mix at 4.6–4.7 was then added in amount to bring the volume in the tank back to the original. The slurry was agitated to effect thorough mixing, then settled. After settling, the wash liquor was drawn off. This second acid treatment is merely a wash and does not effect any material change in the protein itself.

The washed flakes were then extracted by an alkali treatment. Water was run into the tank to the original level and 75 pounds of caustic soda dissolved in 90 gallons of water was added. At the end of half an hour, 85 pounds of lime slurried in 90 gallons of water were added. The pH of the initial alkaline solution was approximately around 12.6, dropping rather rapidly at first and then more slowly until it becomes practically stable at pH 12 to 11.8. The alkaline slurry was agitated and kept at approximately 110–112° F. for an hour and a half, after which the slurry was settled.

After settling the clear alkaline liquor was decanted off and the extracted flakes were then separated from the remainder of the liquid. The extracted flakes were washed with water, this may be accomplished during the separation process if for example screening is the method of separation employed, or the washing may be performed as a separate step. In either case the wash liquor is added to the liquor obtained in separating the flakes from the residue after decantation.

The two extracts may then be combined or they may be separately treated. It has been found, however, that the curd precipitated from the first liquor settles and filters somewhat better than that obtained from the wash liquor. It was also noticed that the viscosity of the protein from the first liquor was slightly lower than that prepared from the wash liquor. This is believed due to the different alkali concentration of the extracts. The pH value of the two is approximately the same although the alkali concentration is higher in the first extract. It is, therefore, desirable to have a relatively high concentration of alkali for the extraction. The alkaline extracts, either separately or combined, are then allowed to stand for several hours while keeping the temperature around 110–112° F. A digestion time of approximately nine hours has been found to yield an excellent product when employed with the other steps described. The time may, of course, be varied depending on the particular results desired and upon other varying conditions.

The alkaline extract was then treated with acid to precipitate the protein as a curd. Acid was added to bring the pH down to the isoelectric point of the protein. The precipitation is preferably carried out at 110° F., to improve the settling and filtering rate. The mix containing the precipitated curd was then settled in a thickener and the thickened curd filtered. The filter cake was then dried in a flash drier under temperatures in excess of 250° F.

The protein thus produced has a good color, forms alkaline solutions of low viscosity which do not gel on standing and which possess low dispersion residues. The adhesive property is excellent, being approximately that of a good grade of milk casein.

Table I shows some of the properties of the new protein as compared to the old protein, and as compared to a good grade of casein.

Table I

| | Gelling tendency water-protein ratio 6:1 10% Na₂CO₃ on protein | Color | Dispersion residue 6:1 ratio 10% Na₂CO₃ | Pipette viscosity 10:1 ratio 10% Na₂CO₃ | MacMichael clayslip viscosity #30 wire 75° F. | Pick oxford waxes |
|---|---|---|---|---|---|---|
| | | | Percent | | | |
| Old reg. protein | Gels on cooling and standing | Good | 16 | 37.6 | 27 | 25 |
| Vegetable protein by hot acid treatment | No gel on standing and cooling | do | 1.0 | 33.4 | 1 | 40 |
| Casein #4 | do | Excellent | 3.3 | 58.6 | 1.5 | 45 |

For making these tests, cuts of the various materials were made by mixing 10 g. of the material with 50 cc. of water and adding 10 cc. of 10% soda ash solution at 160° F. These cuts were used for determining the gelling tendency, color, and dispersion residue. The color was observed by the naked eye. The gel tendency was observed by allowing the cut to stand for a time and cool to room temperature. The dispersion residue was measured by subjecting a portion of the cut to a controlled centrifugal action in a calibrated cylinder, and observing the amount of material separated out of solution, the values given being the percent of dry protein not dissolved in 10% Na₂CO₃. For the pipette viscosity the cuts were diluted with water to a 10 to 1 water-to-protein ratio, and the time in seconds required for the material contained between two marks in a pipette to flow out of the pipette at 20° C., was noted.

For the MacMichael clayslip viscosity and the pick tests, 70 grams of the 6:1 cut were added to 40 g. of English coating clay slurried in 62 cc. of water. A portion of this slip was then coated on paper and the adhesive strength determined by means of Oxford waxes. Oxford waxes are waxes of varying standardized melting points used to determine the adhesion in paper coatings by determining the highest number of the wax which will not pick off the coating when the wax is removed. The MacMichael viscosimeter employs the torsion principle. This is accomplished by measuring the torque or twist imparted to a standard wire of known length by the cylindrical plunger which is suspended on the wire in a rotating cup containing the material, the viscosity of which is being measured. The cup has a capacity of 35 cc. and is rotated at the rate of 20 R. P. M. It is jacketed and kept at a temperature of 75–80° F. at all times during the determination. The cylindrical plunger is 1 cm. in diameter and is submerged 4 cm. in the material. The wire is the standard #30 wire of the MacMichael viscosimeter, Gramercy model. The torque is measured in units (300 units per 360 degrees) and it is read carefully after five minutes of application in order that a constant value is obtained.

The casein used for comparison is a good grade of standard casein used for paper coating.

Cold cuts of the protein prepared according to the procedure described and of casein were made, the amounts of materials being the same as described in the preceding paragraph. The prepared vegetable protein cut to a limpid viscosity within ten minutes. The casein was not completely cut in 30 minutes and gave a thick viscous mass, hard to stir and of a pasty consistency.

In order to determine the effect of the heat treatment, several batches were run employing an acid treatment at room temperature and at a pH of 4.7. When treating with acid at room temperature and carrying out the remainder of the procedure precisely as described above, several differences between the product obtained and from that obtained by the hot treatment were apparent. The yield of protein by the cold treatment was about 6–7% more than by the hot acid treatment (this 6–7% represents actually 6–7% of the original weight of the flakes employed). An examination of the grits from the dried spent flakes showed that the protein content of the hot acid treated material was 15–18% more than that in the case of the cold acid treated material. Since the yield of protein grits is roughly one-third of the original weight of the flakes, this shows that the loss in yield of extracted protein is found in the higher protein content of the grits. This means that by the hot acid treatment 6–7% of the weight of the flakes have been rendered insoluble in the dilute alkali employed in the extraction. Cuts of the protein prepared by the cold acid treatment gelled on standing and cooling, had a high dispersion residue, low pick and high MacMichael viscosity.

A check on the effect of the acid in the hot acid treatment was made by first heating the flakes dry for 48 hours at 180° F. and then conducting a cold acid treatment as above. The protein prepared and dried at a high temperature was no different from that made without the preliminary heating treatment and the yields were the same. Apparently the hot acid treatment renders a portion of the protein of the flakes insoluble in alkali.

It must be emphasized that the protein prepared according to the present invention is different in many of its properties from previously prepared proteins. It is a derived protein. Usually vegetable proteins form such stiff gels when made into coating compositions with pigments that they give mixtures which cannot be brushed out because they contain lumps of gel material which give rise to a rough texture in the coating. It is almost impossible to thin these gels to a smooth flowing consistency and consequently these proteins cannot be used in cold water paints and similar formulations. The hot acid hydrolysis described in this application is such that a protein different from the native protein and different from previously prepared proteins results. Also, the removal of the heat-sensitive proteins gives rise to a protein product which is different from previously prepared proteins in that the product may be dried at relatively high temperatures without the formation of insoluble material, or it may be used after drying, at much higher temperatures than those employed with such proteins as milk casein.

The protein prepared is also readily soluble in weak alkaline solutions closer to a pH of 7 than are the previously prepared materials. As a result, much less alkali can be used to dissolve the protein, making this protein particularly desirable for use with substances which are harmed by high alkalinity such as fabrics, dyes, etcetera.

It is considered that the invention resides in part in—

(1) Rendering the heat-sensitive protein insoluble in water, acids, and alkalies;
(2) Effecting a partial hydrolysis of the desired protein;
(3) The protein product having the improved properties set forth;
(4) The use of a hot acid treatment to accomplish the foregoing.

It will be apparent that various changes may be made from the above described process without departing from the invention herein described. Various acids may be employed at varying pH values. The acid concentration should not, however, be such as to cause undue hydrolysis of the protein; also other times and temperatures may be employed, proper caution being taken against undue hydrolysis of the protein.

Other alkaline treatments using other reagents may be employed. Other alkaline treatments are known and may be employed. The denaturing process of U. S. Patent 1,955,375 may be employed in place of the alkaline treatment disclosed.

Other procedural steps may be employed. Any suitable method may be used to separate solids from liquids. For example, centrifuging may be employed in place of decantation and filtering. Also, other drying methods may be employed for drying the precipitated curd.

Other modes of applying the principles of the invention may be employed instead of those explained, change being made as regards the details herein described, without departing from the spirit of the invention.

What is claimed as new and is desired to secure by Letters Patent of the United States is:

1. The process of preparing a derived vegetable protein from a proteinaceous seed and nut material containing heat sensitive protein and globulins which comprises subjecting the material in a hot aqueous water soluble acid slurry to a hot acid treatment while controlling the time, temperature and pH of the acid treatment so as to cause partial hydrolysis of the globulins present in the proteinaceous material to an extent which renders them readily soluble in weak alkalies, but insufficient to cause fundamental cleavage of the globulins and at a temperature sufficient to render the heat sensitive protein present in the proteinaceous material insoluble in water, acids and alkalies.

2. The process of claim 1 in which the pH of the acid slurry corresponds to the isoelectric point of the globulins.

3. The process of preparing a derived vegetable protein which comprises subjecting proteinaceous seed or nut material in an aqueous water soluble acid slurry to a hot acid treatment at a pH corresponding to the isoelectric point of the globulins present in the material, and continuing the treatment for approximately two hours at a temperature of 170 to 180° F.

4. The process of claim 1 in which the proteinaceous seed or nut material is soybean material.

5. The process of claim 1 in which the proteinaceous seed or nut material is soybean material and the pH corresponds to the isoelectric point of the globulins present in said material.

6. The process of preparing an isolated vegetable protein from proteinaceous seed material containing heat sensitive oleaginous protein and globulins which comprises providing an aqueous slurry of the same containing sufficient water soluble acid to maintain the pH at a point substantially equal to the isoelectric point of the globulins, heat treating the slurry at a temperature and for a time sufficient to render the heat sensitive oleaginous proteins present insoluble in water, acids and alkalies and to cause partial hydrolysis of the globulins present without causing fundamental cleavage thereof, separating the solution from the insoluble material, extracting the globulins from the insoluble residue, digesting the extracted globulins with caustic alkali and lime, and recovering the digested globulin protein.

7. The process of claim 6 in which the proteinaceous seed or nut material is soybean material.

8. The process of preparing an isolated vegetable protein from proteinaceous seed material containing heat-sensitive protein and globulins which comprises treating the same in a hot aqueous water soluble acid acidified slurry at a pH substantially corresponding to the isoelectric point of the globulins in the material, controlling the time and temperature of the hot acid treatment to render the heat sensitive proteins of the seed material insoluble in water, acids and alkalies and to cause partial hydrolysis of the globulins present without causing fundamental cleavage thereof and separating the insolubilized heat sensitive protein in the residue from the globulins present.

9. The process of preparing an isolated vegetable protein from proteinaceous seed material containing heat sensitive albuminous protein and globulins which comprises providing an aqueous slurry of the same containing sufficient water soluble acid to maintain a pH at a point substantially equal to the isoelectric point of the globulins, heat treating the slurry at a temperature for a time sufficient to render the heat sensitive albuminous protein present insoluble in water, acids and alkalies and to cause partial hydrolysis of the globulins present without causing fundamental cleavage thereof, separating the solution from the insoluble material and extracting the globulins from the insoluble material whereby the globulins extracted are free from heat sensitive albuminous protein.

10. The process of preparing an isolated vegetable protein from proteinaceous seed material containing heat sensitive albuminous protein and globulins which comprises providing an aqueous slurry of the same containing sufficient water soluble acid to maintain the pH at a point substantially equal to the isoelectric point of the globulins, heat treating the slurry at a temperature and for a time sufficient to render the heat sensitive oleaginous proteins present insoluble in water, acid and alkalies and to cause partial hydrolysis of the globulins present without causing fundamental cleavage thereof, separating the solution from the insoluble material, extracting the globulins from the insoluble material and subjecting the extracted globulins to an aqueous digestion with caustic alkali and lime.

11. The process of preparing an isolated soybean protein which comprises providing an aqueous slurry of soybean material containing sufficient water soluble acid to maintain the pH at a point substantially equal to the isoelectric point of the globulins present in the meal, heat treating the slurry at a temperature and for a time sufficient to render the heat sensitive albuminous proteins present insoluble in water, acids and alkalies and to cause partial hydrolysis of the globulins without causing fundamental cleavage thereof, subjecting the thus treated globulins to an aqueous alkaline digestion and recovering the digested globulins.

12. The process of preparing a derived vegetable protein from proteinaceous seed or nut material containing heat sensitive protein and globulins which comprises subjecting the material in a hot aqueous water soluble acid slurry to a hot acid treatment while controlling the time, temperature and pH of the treatment so as to cause partial hydrolysis of the globulins present in the proteinaceous material to an extent which renders them readily soluble in weak alkalies but insufficient to cause fundamental cleavage of the globulins and at a temperature sufficient to render the heat sensitive albuminous protein present in the proteinaceous material insoluble in water, acids and alkalies, extracting the partially hydrolyzed globulins from the material and subjecting the extracted globulins to an aqueous alkaline digestion.

13. In a process for preparing a derived vegetable protein from proteinaceous seed and nut material containing globulins, the step comprising treating a mixture of seed material, water and a water soluble acid at an elevated temperature for a time, at a temperature and at a pH sufficient to cause partial hydrolysis of globulins present in said material but insufficient to cause fundamental cleavage thereof.

PERCY L. JULIAN.
ANDREW G. ENGSTROM.